US012807424B2

(12) United States Patent
Benes

(10) Patent No.: US 12,807,424 B2
(45) Date of Patent: Nov. 24, 2026

(54) DEPOSITOR APPARATUS

(71) Applicant: David J. Benes, Blair, NE (US)

(72) Inventor: David J. Benes, Blair, NE (US)

( * ) Notice: Subject to any disclaimer, the term of this patent is extended or adjusted under 35 U.S.C. 154(b) by 192 days.

(21) Appl. No.: 18/403,404

(22) Filed: Jan. 3, 2024

(65) Prior Publication Data

US 2024/0351800 A1 Oct. 24, 2024

Related U.S. Application Data

(60) Provisional application No. 63/460,489, filed on Apr. 19, 2023.

(51) Int. Cl.

*B65B 5/10* (2006.01)
*B65B 35/12* (2006.01)
*B65B 35/32* (2006.01)
*B65B 39/00* (2006.01)
*B65B 39/12* (2006.01)
*B65B 65/00* (2006.01)
*B65G 11/02* (2006.01)
*B65G 11/16* (2006.01)
*B65G 11/20* (2006.01)
*B65G 41/00* (2006.01)
*B65G 47/42* (2006.01)

(52) U.S. Cl.

CPC ............ *B65G 47/42* (2013.01); *B65G 11/023* (2013.01); *B65G 11/163* (2013.01); *B65G 11/203* (2013.01); *B65G 41/003* (2013.01); *B65G 41/008* (2013.01); *B65G 2203/0258* (2013.01); *B65G 2203/044* (2013.01)

(58) Field of Classification Search

CPC ......... B65B 5/101; B65B 35/12; B65B 35/32; B65B 39/007; B65B 39/12; B65B 65/003; B65B 65/006; B65G 11/02; B65G 11/023

USPC ............................ 53/248; 198/532, 540, 637

See application file for complete search history.

(56) References Cited

U.S. PATENT DOCUMENTS 2,626,094 A * 1/1953 Mcclelland ............. B65B 35/24 141/237
3,354,799 A * 11/1967 Harrison ................ B65B 9/213 156/200
3,414,312 A * 12/1968 Garlinghouse ....... E04G 21/025 222/144.5
5,029,431 A * 7/1991 Weening ................ B65B 5/101 53/244
5,178,196 A * 1/1993 Garacci .................. B65B 55/20 141/59

(Continued)

*Primary Examiner* — Shelley M Self
*Assistant Examiner* — Patrick B Fry
(74) *Attorney, Agent, or Firm* — Suiter Swantz IP

(57) ABSTRACT

A depositor apparatus is disclosed. The depositor apparatus may include an operator assembly configured to receive an operator, a conveyor assembly coupled to the operator assembly and configured to move a plurality of product, and a multi-chute assembly coupled to the conveyor assembly and aligned with the operator assembly. The multi-chute assembly includes a plurality of chute assemblies. Each chute assembly includes a chute and a door assembly coupled to the chute and configured to selectively open and thereby drop a product into a single pouch below the door assembly. The door assembly includes a first door and a second door. The door assembly may be configured to prevent liquid or byproduct from the product to land on a seal edge of the single pouch.

16 Claims, 8 Drawing Sheets

(56) References Cited

U.S. PATENT DOCUMENTS

| | | | | | |
|---|---|---|---|---|---|
| 6,000,200 | A * | 12/1999 | Germunson | B65B 25/04 | 53/154 |
| 6,119,438 | A * | 9/2000 | Bacon | B65B 9/2028 | 53/493 |
| 7,770,713 | B2 * | 8/2010 | Nakagawa | G01G 19/393 | 198/530 |
| 8,661,774 | B2 * | 3/2014 | De Vos | G01G 19/393 | 53/502 |
| 8,713,899 | B2 * | 5/2014 | Hortig | B65B 67/02 | 414/280 |
| 9,309,013 | B2 * | 4/2016 | Elias | B65D 77/003 | |
| 11,319,096 | B2 * | 5/2022 | Gibson | B65B 41/14 | |
| 2011/0079588 | A1 * | 4/2011 | Kraus | G01N 1/36 | 219/201 |
| 2012/0247066 | A1 * | 10/2012 | Dunn | F25C 5/20 | 53/111 R |
| 2013/0255199 | A1 * | 10/2013 | Haschke | B65B 25/064 | 53/381.1 |
| 2018/0036897 | A1 * | 2/2018 | Leizer | B65B 25/18 | |

* cited by examiner

DEPOSITOR APPARATUS

CROSS-REFERENCE TO RELATED APPLICATION

The present application claims the benefit under 35 U.S.C. § 119 (e) of U.S. Provisional Application Ser. No. 63/460,489, filed Apr. 19, 2023, entitled DEPOSITOR APPARATUS, naming David J. Benes, which is incorporated herein by reference in the entirety.

FIELD

The present disclosure is directed to product packaging apparatuses, and more specifically to a depositor apparatus.

BACKGROUND

It has become common to package irregular shaped products into plastic pouches (e.g., thermoformer pouches) and then seal a top layer to contain the product. Plastic pouches may also be referred to as blister packaging. For example, pouches may be utilized to package pieces of chicken, fish, pork, and beef. Typically, the process of packaging a meat and fish product may be done manually by individuals who work in an assembly line fashion where products may be on a conveyor, handled by a person, and then placed into a pouch whereby the top side of the pouch is sealed with a top layer. When a meat and fish product is placed in the pouch, liquid associated with the meat and fish product may land on the seal edge of the pouch which can prevent an effective seal with the top layer. In order to prevent such a problem, an individual may be responsible for wiping off the seal edge of the pouch after the product is placed in the pouch. When an individual is responsible for wiping off the seal edge, the cost of packaging the product is increased, and the efficiency of the process is reduced.

SUMMARY

Accordingly, the present disclosure is directed to a depositor apparatus. The depositor apparatus may allow the placement of a meat and fish product into a pouch without any associated liquid landing on a seal edge of the pouch. Advantageously, the depositor apparatus may allow for rapid packaging of a meat and fish product at a substantially lower cost than a fully robotic apparatus.

A depositor apparatus is disclosed in accordance with one or more illustrative embodiments of the present disclosure. In one illustrative embodiment, the depositor apparatus may include an operator assembly configured to receive an operator, a conveyor assembly coupled to the operator assembly and configured to move a plurality of product, and a multi-chute assembly coupled to the conveyor assembly and aligned with the operator assembly. In another illustrative embodiment, the multi-chute assembly may include a plurality of chute assemblies. In another illustrative embodiment, each chute assembly may include a chute and a door assembly coupled to the chute and configured to selectively open and thereby drop a product into a single pouch below the door assembly. In another illustrative embodiment, the door assembly may include a first door and a second door. In another illustrative embodiment, the opening of the door assembly may open from a center of the door assembly such that the first door and the second door swing down and outwards away from each other. In another illustrative embodiment, the door assembly may be configured to prevent any liquid or byproduct from the product to land on a seal edge of the single pouch.

In a further aspect, the first door may be timed with the second door to ensure the opening of the first door is synchronized with the second door so the product is configured to drop from the center of the door assembly. In another aspect, the first door may include a first set of gear teeth and the second door may include a second set of gear teeth configured to align with and engage the first set of gear teeth to provide for the timing between the first door and the second door. In another aspect, each chute assembly may further include a door actuator coupled to at least one of the first door or the second door, and configured to perform the selectively opening of the door assembly. In another aspect, the multi-chute assembly may be coupled to a multi-chute assembly actuator configured to lower the multi-chute assembly relative to a plurality of pouches. In another aspect, each chute assembly may further include a weight sensor configured to sense an absence of the product in the chute, and alert the operator based on the absence of the product via an operation of a light.

In a further aspect, each chute assembly may further include a laser level sensor configured to sense an absence of the product in the chute. In another aspect, the chute assembly may include non-stick surfaces. In another aspect, the non-stick surfaces may include at least one of polished surfaces or electro-coated surfaces. In another aspect, the depositor apparatus may include three or more wheels, wherein the depositor apparatus is configured to roll into and out of an operating position via the three or more wheels. In another aspect, the depositor apparatus may include guide plates configured to be used to align the depositor apparatus with an operation position. In another aspect, the depositor apparatus may include an opening between each chute and the conveyor assembly, wherein the opening is configured to receive the product. In another aspect, the plurality of chute assemblies of each multi-chute assembly may be staggered and configured to align with a plurality of diagonally staggered pouches.

In a further aspect, the depositor apparatus may include a second operator assembly and a second multi-chute assembly aligned with the second operator assembly. In another aspect, the operator assembly may include a platform configured to support the operator, and a step coupled to the platform. In another aspect, the platform may be height adjustable. In another aspect, the first door and the second door each may include an inner-surface recessed feature proximate to an edge of the first door and an edge of the second door. In another aspect, each multi-chute assembly may be configured to individually slide away from the conveyor assembly for cleaning.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1A:
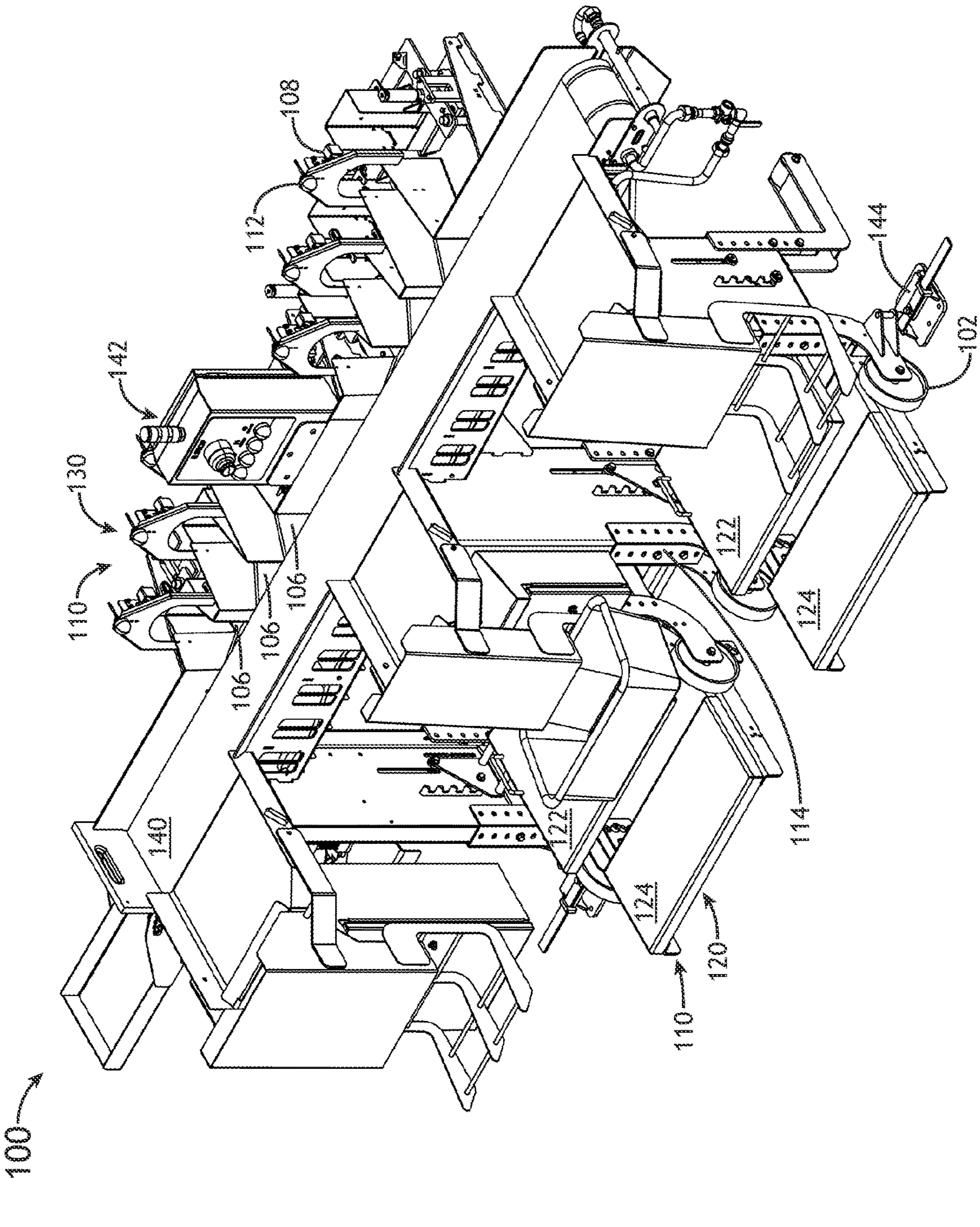
FIG. 1A is a perspective view of a depositor apparatus, in accordance with an embodiment of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Broadly speaking, the depositor apparatus may allow the placement of a meat and fish product into a pouch without any associated liquid or byproduct landing on a seal edge of the pouch. Advantageously, the depositor apparatus allows for rapid packaging of a meat and fish product at a substantially lower cost than a fully robotic and fully automated apparatus. The depositor apparatus includes an operator assembly for an operator to stand at, a conveyor assembly for continuously moving meat product to the operator, and a multi-chute assembly for the operator to drop the product into. Each chute of the multi-chute assembly utilizes a synced drop door configuration so that the product drops from the center of each chute and prevents liquid from dripping on a seal edge of pouch packages below the doors. Additional configurations such as a recessed feature near the edge of each chute door may aide in reducing drips. Sensors such as lasers and weight sensors may be used to ensure product is in each chute to fill the pouches before opening the chute doors. This operator-style depositor with drop door chutes and other limitations may be significantly lower cost than fully robotic mechanisms while reducing drip issues that other methodologies are prone to.

The depositor apparatus may be quickly assembled and may be easily removed from other packaging equipment for daily cleaning and/or maintenance. The depositor apparatus may be rolled out of the way horizontally (e.g., rolled away as one whole assembly on wheels), but rotating removal, or vertical removal may be employed also. Sections of the depositor apparatus may include wheels to allow the section to be rolled away for maintenance and cleaning. The depositor apparatus may be easily installed into the desired operating position after daily cleaning. In one embodiment, the depositor apparatus may use pins and guide plates to become connected and fixed as an operating apparatus, but other fastening devices may be employed in alternative embodiments, such as clamps. It is desirable that the depositor apparatus may be re-connected in a repeatable and reliable manner after daily cleaning. Thus, the depositor apparatus may include markers to ensure such repeatable and reliable re-connection. The depositor apparatus may include adjustable operator platforms, but external platforms or other operator stations could also be employed.

Referring to FIG. 1A, a diagram illustrating a depositor apparatus 100 in accordance with an embodiment of this disclosure is shown.

Figure 4:
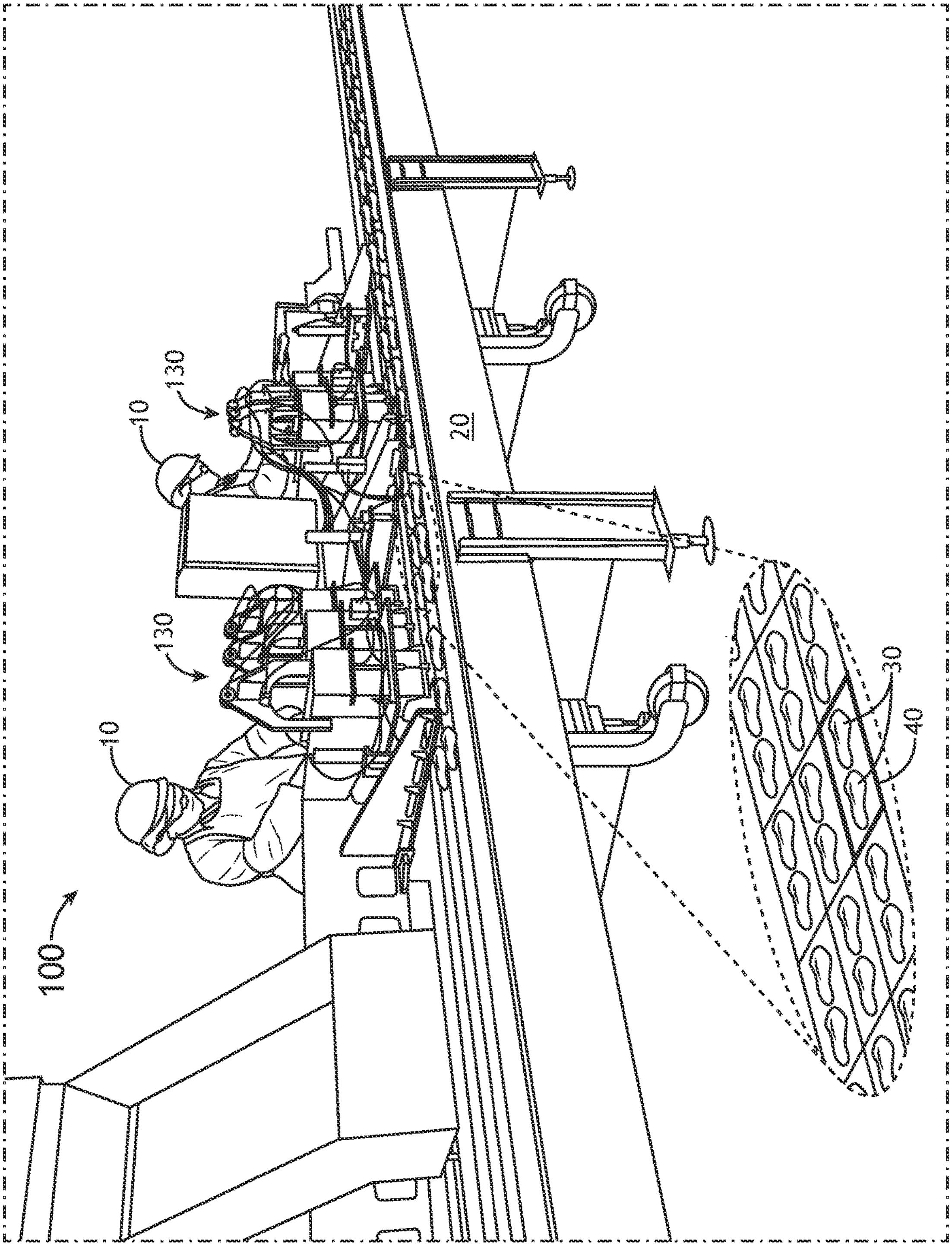
FIG. 4 is a perspective view of a depositor apparatus in an operating position for depositing product in an array of pouches, in accordance with an embodiment of this disclosure.

The depositor apparatus 100 may include an operator assembly 120 that may be configured to accommodate an operator 10 (e.g., see operator 10 in FIG. 4). The depositor apparatus 100 may also include a conveyor assembly 140 coupled to the operator assembly 120 and configured to move a plurality of product 30 (e.g., meat and fish). Any number (e.g., one, two (as shown), three, or more) of paired operator assemblies 120 and multi-chute assemblies 130 may be used. For example, a first and second operator assembly 120 and a first and second multi-chute assembly 130 may be used. In embodiments, the operator assembly 120 may be attached (as shown) to the other assemblies, detachable (stationary and fixed to the floor), lowerable vertically from above, and/or the like.

Additionally, the depositor apparatus 100 may include a (e.g., one or more) multi-chute assemblies 130 that may be coupled to the conveyor assembly 140 and aligned with the operator assembly 120 such that the multi-chute assembly 130 is located on the opposite side of the conveyor assembly 140 from the operator assembly 120. In this way, the non-conveyor assemblies 110 (e.g., multi-chute assembly 130 and operator assemblies 120), may align with each other. This alignment may allow the operator to slide (or reach and drop) the product 30 into the multi-chute assembly 130.

The operator assembly 120 may include a platform 122 that may be configured to support the operator, and a step 124 coupled to the platform 122. The platform 122 may be configured to be height adjustable (e.g., as shown).

The depositor apparatus 100 may include three or more wheels 102. For example, the wheels 102 may be configured to roll (e.g., horizontally roll along the ground) the depositor apparatus 100 into and out of an operating position (see FIG. 4 for an example of the depositor apparatus 100 in an operating position). The operating position may be defined as the chute assemblies 210 aligned above the pouches 40 to drop the product 30 into the pouches 40. The wheels 102 may be configured to be height adjustable via a series of holes 114 (e.g., vertically aligned holes and a fastener (e.g., bolt)).

The depositor apparatus 100 may include an opening 106 between each chute 212 and the conveyor assembly 140, configured to receive the product 30. For example, the opening 106 may be defined by surfaces, such as a defined passageway leading to the conveyor.

The depositor apparatus 100 may be configured to be locked down by a lock feature 144 configured to engage the ground, such as to hold the depositor apparatus 100 in the operational position. For example, the lock feature 144 may include a surface/component/foot configured to be lowered below the wheels 102.

Figure 1B:
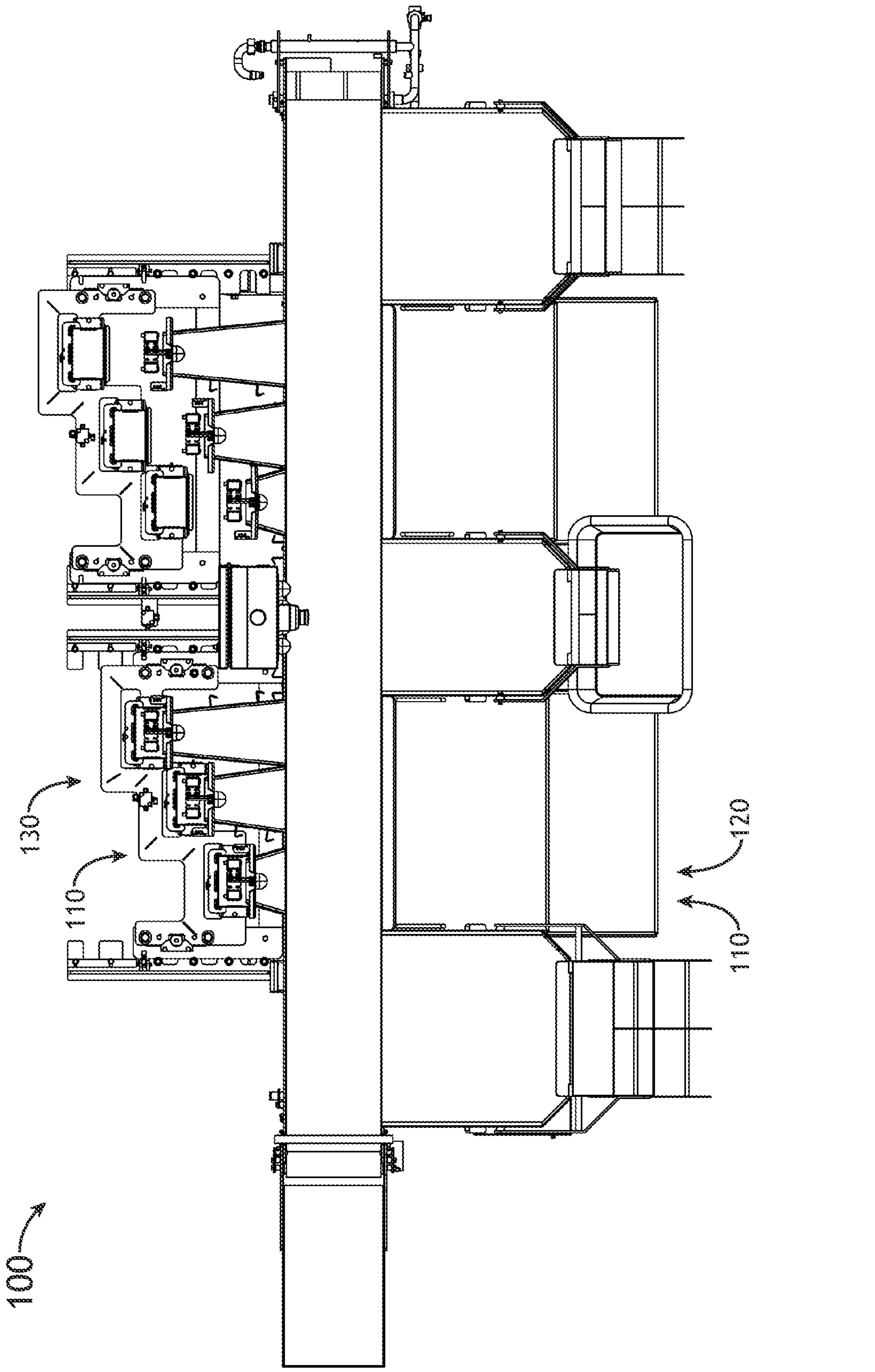
FIG. 1B is a top-down view of the depositor apparatus, in accordance with an embodiment of this disclosure.

Referring to FIG. 1B, a top-down view illustrating the depositor apparatus 100 in accordance with an embodiment of this disclosure is shown.

The multi-chute assembly 130 on the right side is shown moved away from the conveyor assembly 140. In such a way (e.g., not being permanently fixed), each multi-chute assembly 130 may be configured to individually slide away from the conveyor assembly for cleaning. For instance, any method and structure may be used in the art, such as a slot on a surface of the conveyor assembly 140 aligned with a protrusion/tab on each side of the multi-chute assembly 130, wherein the protrusion/tab is slidable in the horizontal slot.

The depositor apparatus 100 may include guide plates that may be configured to align the depositor apparatus 100 with the operating position.

Figure 2:
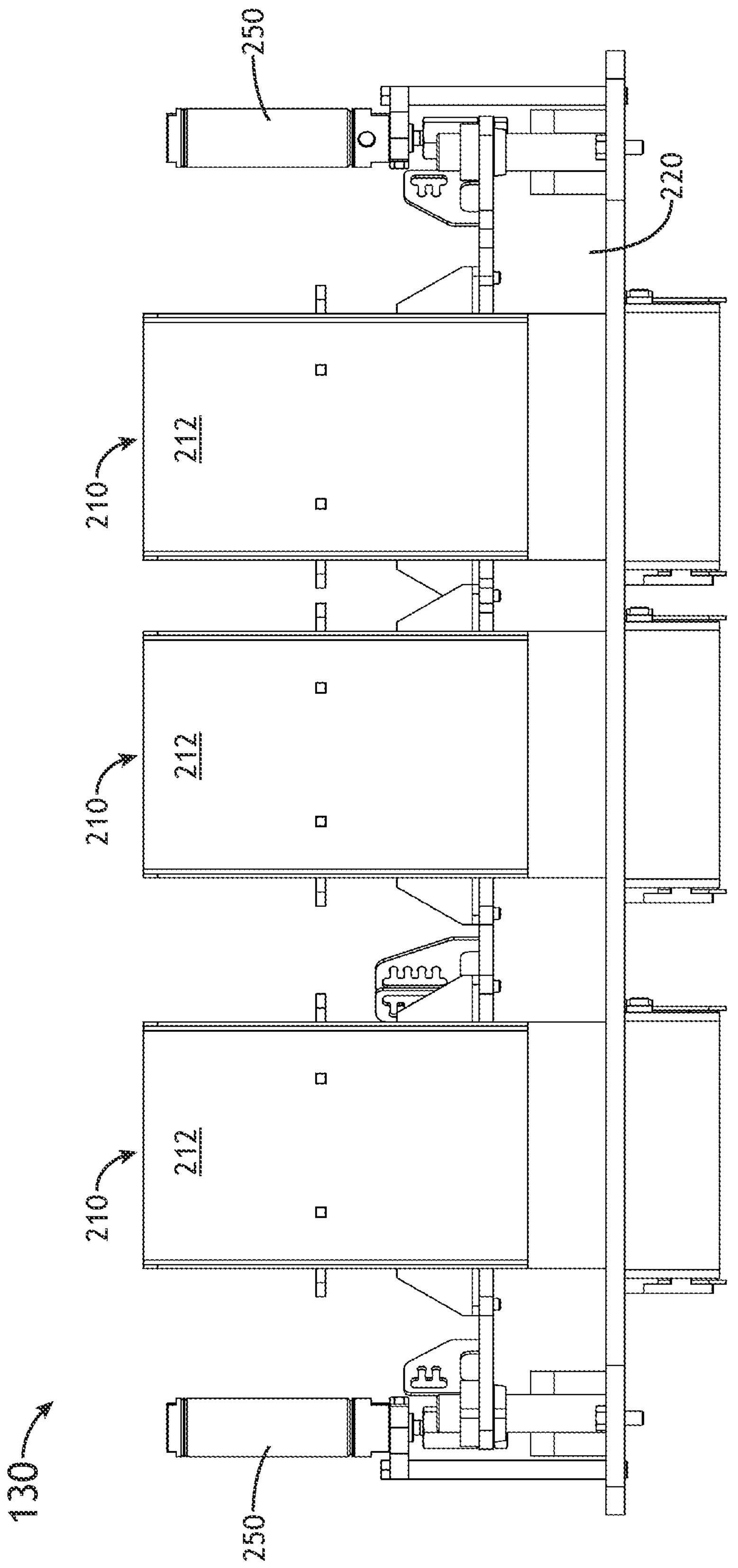
FIG. 2 is a front view of a multi-chute assembly of the depositor apparatus, in accordance with an embodiment of this disclosure.

Referring to FIG. 2, a front view illustrating a multi-chute assembly 130 of the depositor apparatus 100 in accordance with an embodiment of this disclosure is shown.

The multi-chute assembly 130 may include a plurality of chute assemblies 210. For example, the multi-chute assembly 130 may include two or more chute assemblies 210. For example, the multi-chute assembly 130 may include three or more chute assemblies 210.

The chute assemblies 210 of each multi-chute assembly 130 may be staggered (e.g., diagonally staggered as shown in FIG. 1B) and may be configured to align with a plurality of pouches 40, such as three rows of pouches 40. From the operator's point of view, the chute assemblies 210 are aligned from left to right, but the operator is able to fill pouch rows from front to three rows deep.

The multi-chute assembly 130 may be coupled to one or more multi-chute assembly actuators 250 configured to lower the multi-chute assembly 130 relative to a plurality of pouches 40 (see FIG. 4 for example pouches 40). For example, a multi-chute assembly 130 on each side of the multi-chute assembly 130 may be vertically orientated to move the multi-chute assembly 130 near and into the pouches 40 and retract back again, and repeat once for each depositing of product 30. Lowering the multi-chute assembly 130 into the pouches 40 may further reduce the risk of dripping onto the pouch edges.

The chute assemblies 210 may be coupled to a multi-chute frame 220 of the multi-chute assembly 130. For example, the multi-chute assembly actuators 250 may be coupled to the frame 220 and also coupled to the conveyor assembly 140. This coupling may enable a lowering of the frame 220 and attached chute assemblies 210 relative to the conveyor assembly 140.

Figure 3A:
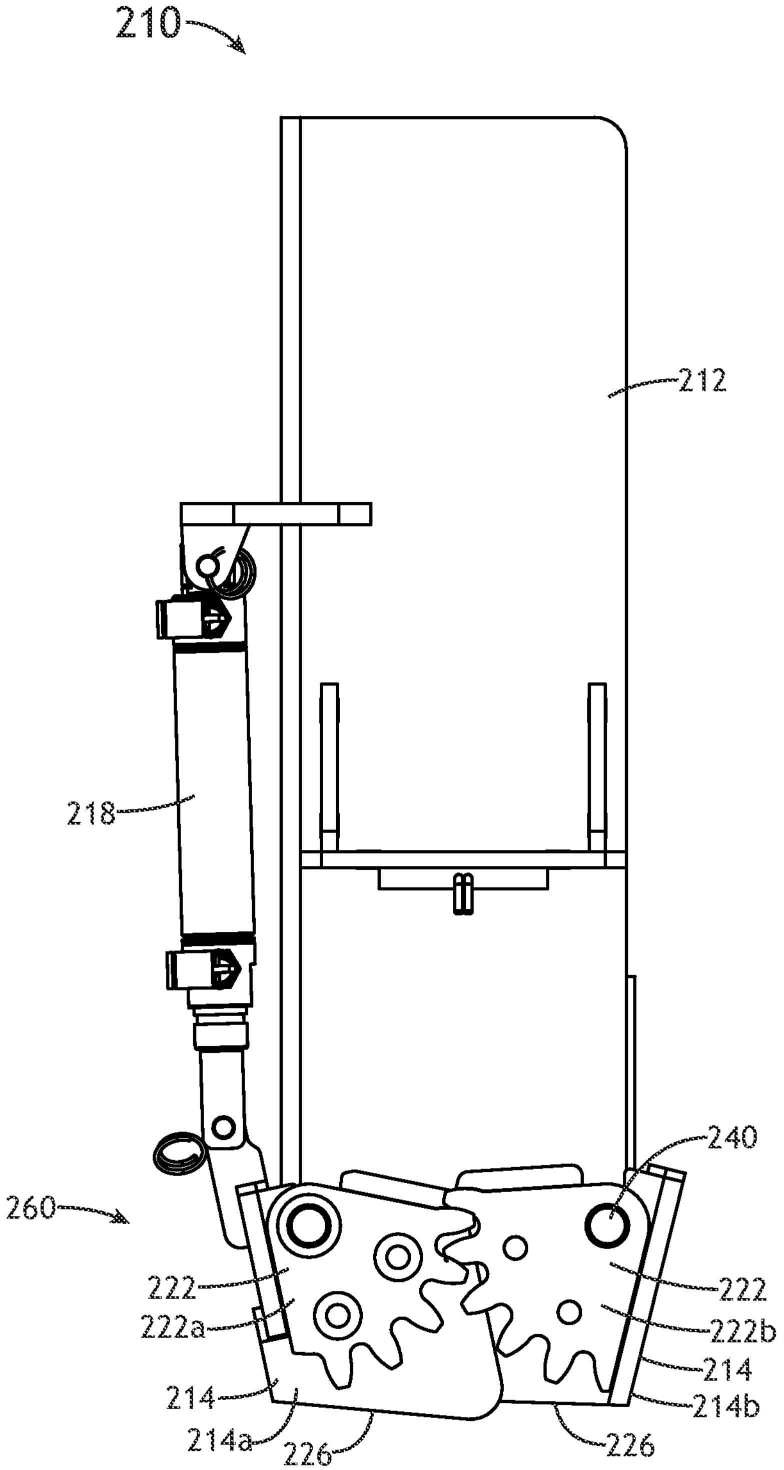
FIG. 3A is a side view of a chute assembly of the multi-chute assembly, in accordance with an embodiment of this disclosure.

Referring to FIG. 3A, a side view illustrating a chute assembly 210 of the multi-chute assembly 130 in accordance with an embodiment of this disclosure is shown.

Each chute assembly 210 of the plurality of chute assemblies may include a chute 212 and a door assembly 260. For example, the door assembly 260 may include a first door 214*a*, second door 214*b*, and/or a door actuator 218. The door assembly 260 may be coupled to the chute 212 and may be configured to selectively open (e.g., via selective operator or controller-controlled actuation of the door actuator 218), thereby allowing a product 30 to drop into a single pouch 40 below the door assembly 260.

The opening of the door assembly 260 (as shown) may be configured to open from the center (e.g., center of inside of lower opening chute) of the door assembly 260, causing the first door 214*a* and the second door 214*b* to swing down (e.g., inner edges 224 of each door swing down due to a rotation of the doors around shafts 240) and outwards away from each other. This may allow product 30 to be relatively slowly lowered downward as the doors 214 lower, while also allowing the product 30 to be dropped in the center, all of which may minimize the likelihood of dripping liquid on the edge of the pouch 40. The first door 214*a* may be timed with the second door 214*b* to ensure that the opening of the first door 214*a* is synchronized with the second door 214*b*, allowing the product 30 to drop from the center of the door assembly 260. In these ways, for example, the door assembly 260 is configured to prevent any liquid or byproduct from the meat and fish product from landing on the seal edge of the single pouch.

The timing/synching may be performed using any method in the art or disclosed herein, such as via gear teeth 222. For example, the first door 214*a* may include a first set of gear teeth 222*a* and the second door 214*b* may include a second set of gear teeth 222*b*. The second set of gear teeth 222*b* may be configured to align with and engage the first set of gear teeth 222*a* to provide for the timing between the first door 214*a* and the second door 214*b*. By way of another example, the timing/synching may be performed via slotting/tabbing (e.g., timing pin and slot (not shown)) near a transverse lower edge 226 of the first door 214*a* to the second door 214*b*. In an alternative embodiment, the door assembly 260 may be a horizontally sliding door (not shown) that may prevent any liquid or byproduct from dripping or smearing onto the seal edge of a pouch 40.

The door assembly 260 may further include a rotate feature 240 (e.g., axel/shaft 240) coupled to the chute 212, with one rotate feature 240 for each door 214 on opposing sides of the chute 212.

The chute assembly 210 may include a door actuator 218 coupled to at least one of the first door 214*a* or the second door 214*b*. The door actuator 218 may be configured to perform the selective opening (and closing) of the door assembly 260. The door actuator 218 may be coupled to the chute 212.

Figure 3B:
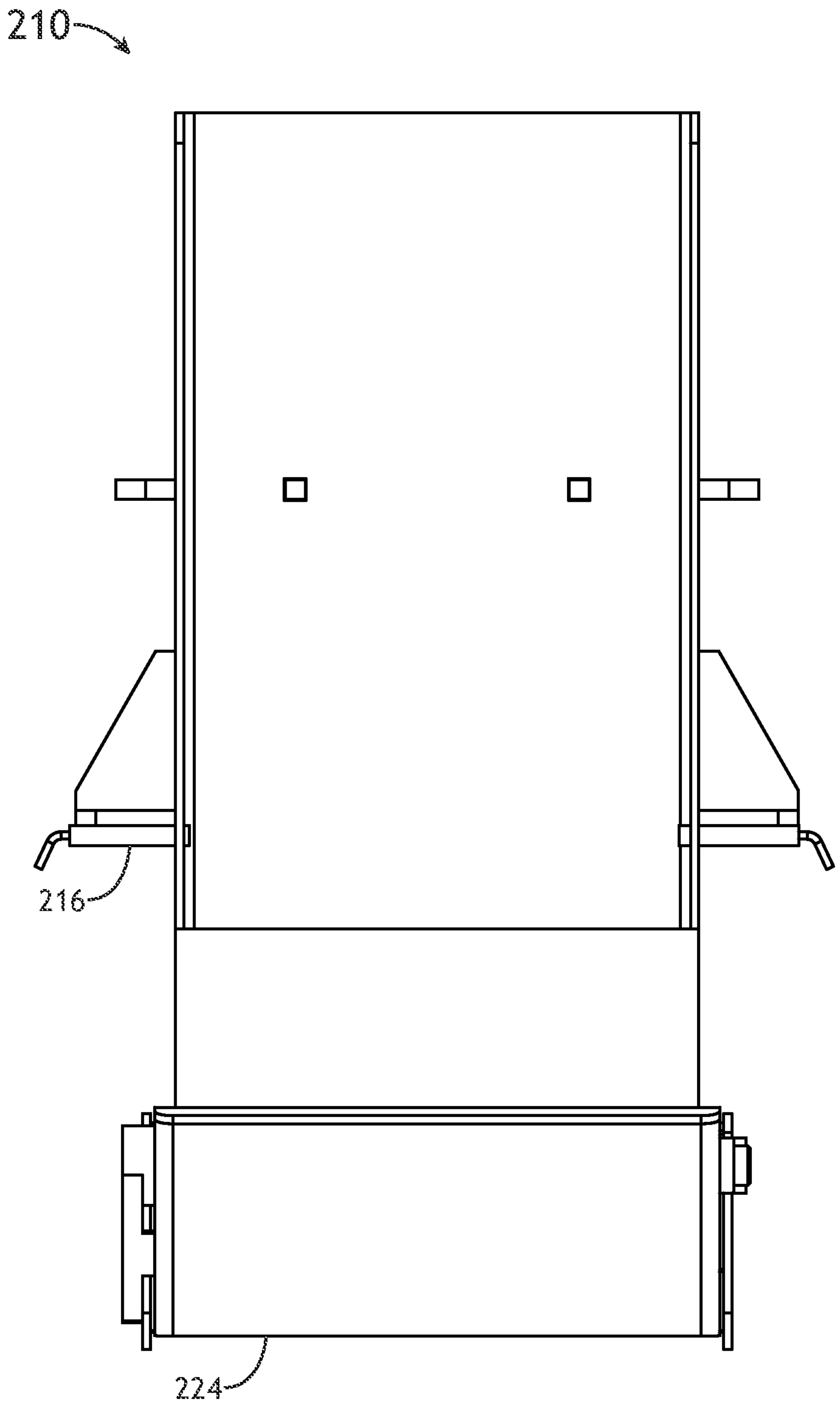
FIG. 3B is a front view of the chute assembly, in accordance with an embodiment of this disclosure.

Referring to FIG. 3B, a front view illustrating the chute assembly 210 in accordance with an embodiment of this disclosure is shown.

Each chute assembly 210 may include a weight sensor 216 configured to detect the absence of the product 30 in the chute 212, and alert/notify the operator 10 based on the absence of the product 30 through the operation (activation and/or deactivation) of a light 112 (see lights 112 in FIG. 1A). For example, the light 112 may be located proximate (e.g., above) each chute 212 and communicatively coupled to the weight sensor 216.

Each chute assembly 210 may include a laser level sensor 108 (e.g., one or two sensors per chute 212; and/or the like) that may be configured to detect the absence (i.e., based on a measured delay between sending and receiving a laser pulse directed down the chute 212) of the product 30 in the chute 212. The laser level sensor 108 may be located proximate (e.g., above) each chute 212 and/or communicatively coupled to a light 112. The depositor apparatus 100 may include both a laser level sensor 108 and a weight sensor 216, and/or either one individually.

When a particular chute 212 senses product via a sensor (e.g., weight sensor 216, proximity sensor, laser sensor 108, and the like) the indicator of the light 112 may be configured to change. For example, when product 30 is identified in the chute 212, the color of the light 112 may change. Other indicators of a light 112 other than color may include flashing of a light, a change in the light intensity, a turning on of the light, a turning off of the light, and the like. If the operator 10 can see product 30 in the chute 212 but the indicator 112 has not changed, the operator 10 may bypass the sensor (e.g., by pushing the light 112, where the light 112 includes a push button structure for pushing the light 112). It is contemplated that when all the chutes 212 have product loaded in them, then the depositor apparatus 100 may (e.g., automatically, via program instructions stored on memory) lower all the chutes 212. For example, this may be when all six chutes 212 of two multi-chute assemblies 130 have been loaded with product by two different operators 10 according to one embodiment of the disclosure. After the chutes 212 have been lowered, the depositor apparatus 100 may be configured to (automatically) open the chute drop doors 214 associated with each chute assembly 210.

The indicator lights 112 above each chute 212 may revert to a default state (e.g., turn off, reset) after the door assembly 260 drops the product. While a light 112 to provide status is contemplated, other types of devices may be employed without departing from the scope and intent of the present disclosure, such as an audible warning, a display, and the like.

Referring to FIG. 4, a diagram illustrating a depositor apparatus 100 in an operating position for depositing product 30 in an array of pouches 40 in accordance with an embodiment of this disclosure is shown.

The depositor apparatus 100 may be configured such that the chute assemblies 210 are aligned with the pouches 40 of the thermoformer 20. The thermoformer 20 may include an array of pouches 40 on a thermoformer conveyor, configured to receive product 30 and, once moved down the line, permanently seal the product 30 inside the pouches 40 in a separate thermoforming process.

The depositor apparatus 100 may be configured to vibrate each chute 212 to dislodge the product 30. For example, the depositor apparatus 100 may include an air vibrator that may be employed to vibrate or shake the chute 212 before and/or during opening. The air vibrator may be a pneumatic vibrator. In an alternative embodiment, an electric vibrator may be employed to vibrate or shake the chute. After vibration, it is contemplated that any liquid or byproduct from the meat and fish product 30 may fall within the pouch 40 and avoid the seal edge of the pouch when the chute drop door 214 is opened. It is further contemplated that the chute drop door 214 and the vibration of the chute 212 may allow a meat and fish product 30 to be placed in the pouch 40 in a horizontal manner. For example, if two chicken breasts 30 are placed within each pouch 40, then they could pile in a manner such that the food product 30 is taller than the pouch 40 is deep. However, vibration of the chute 212 along with the synchronized opening of the chute drop doors 214 may allow the meat and fish product 30 to lay flat within the pouch 40.

Advantageously, the depositor apparatus 100 may be configured to integrate with existing and conventional sealing equipment (e.g., existing blister pouch conveyor assemblies 20).

Figure 5:
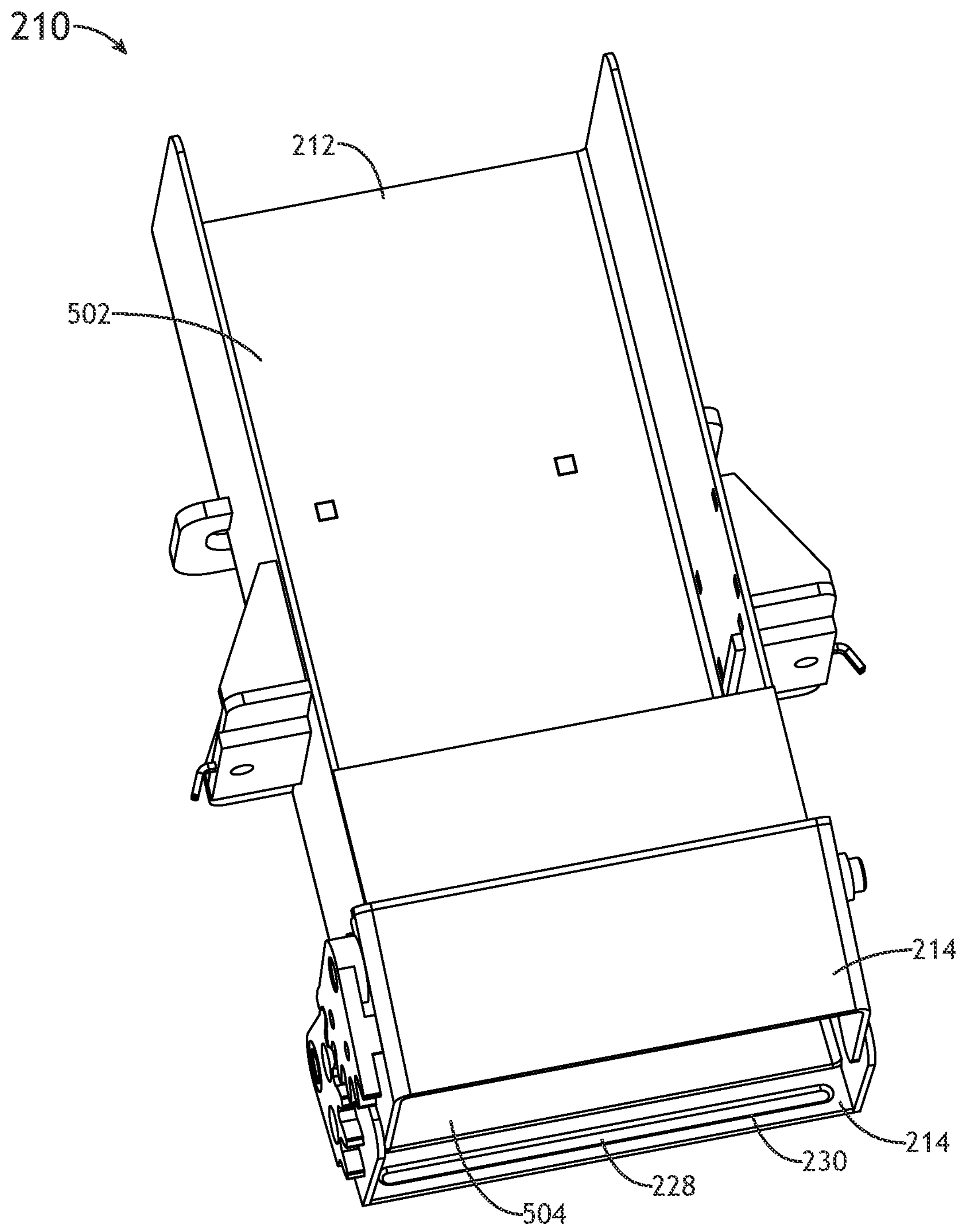
FIG. 5 is a view of a recessed feature of a door of a chute assembly, in accordance with an embodiment of this disclosure.

Referring to FIG. 5, a view illustrating a recessed feature 230 of a door 214 of a chute assembly 210 in accordance with an embodiment of this disclosure is shown.

The first door 214*a* and the second door 214*b* each may include an inner-surface anti-drip feature 230 (i.e., inner surface recessed feature 230). For example, the inner-surface recessed feature 230 may be located proximate (e.g., within 1 inch) to a lower edge of the first door 214*a* and a lower edge of the second door 214*b*. For instance, the recessed feature 230 may include a recessed surface 228 configured to receive and store liquid near the lower edge (e.g., lower edge 224 of FIG. 3B), disposed along a length proximate to the lower edge 224. The recessed feature 230 may be any size configured to store and capture liquid. For example, the recessed feature 230 may be between 0.01 inches and 0.3 inches deep (measured as a depth into the inner surface 504 of each door). For example, the recessed feature 230 may be at least 3 inches long, along the edge 224. For example, the recessed feature 230 may be between 0.05 inches and 1 inches wide (measured normal to the edge 224).

The chute assembly 210 may include non-stick surfaces (e.g., inside surfaces 502 of the chute 212 and inner surfaces 504 of doors 214 configured to contact the product 30). For example, the inside surfaces of the chute 212 and chute drop door 214 may include a coating or be processed in such a way to ensure that liquid and byproduct do not stick to the surfaces. For example, the non-stick surfaces 502, 504 may include at least one of polished surfaces or electro-coated surfaces.

Components such as a controller 142 of FIG. 1A (e.g., programmable logic controller (PLC)) may be employed to control the operation of the depositor apparatus 100. For example, the controller 142 may be configured to communicate with one or more sensors, control one or more indicator 112 functions, and control movement of the chutes 212 and/or chute drop doors 214. It is contemplated that the depositor apparatus 100 may be controlled via a hydraulic controller and use of hydraulic cylinders (e.g., door actuator 218, multi-chute actuator 250). For example, controller 142 of FIG. 1A may include, house, and/or be such components. Additionally, electrical motors may be employed in another embodiment of the disclosure.

Figure 6:
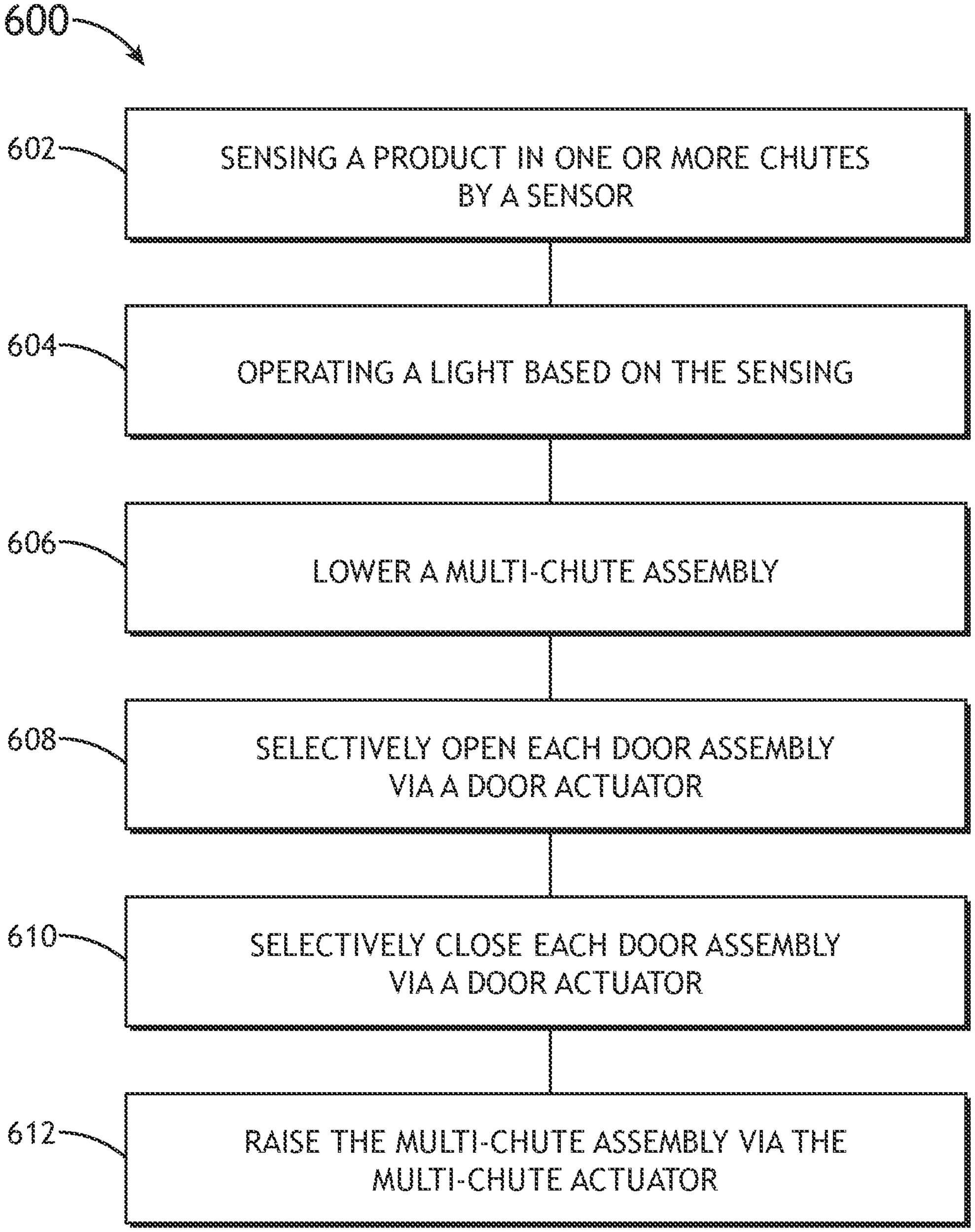
FIG. 6 is a flow diagram illustrating steps performed in a method for depositing a product, in accordance with one or more embodiments of the present disclosure.

FIG. 6 shows a flow diagram illustrating steps performed in a method 600 for depositing a product 30 in accordance with one or more embodiments of the present disclosure is shown. In embodiments, a method 600 of a process may be performed or implemented using the depositor apparatus 100 (e.g., implemented on a controller 142 communicatively coupled to the actuators (actuators 250, 218); sensors 108, 216; and/or lights 112). For example, the controller may include tangible, non-transitory memory (e.g., hard drive of a computer) with program instructions stored therein configured to perform steps of the method. The method 600 may be configured to be performed in tandem with an operator 10, such as being triggered/started when an operator 10 drops product 30 in chutes 212, causing the controller 142 to sense the product 30 via sensors and to perform steps of the method 600. The method may be performed in one or more steps.

At a step 602, a product 30 in one or more chutes 212 is sensed by a sensor (e.g., laser sensor 108 and/or weight sensor 216).

At a step 604, a light 112 is operated (e.g., turned on) based on the sensing.

The controller 142 may be configured to accept an operator-override input (e.g., via a sensed touch/push of the light 112 which may include a push button) for each chute 212 individually when an absence of product 30 is sensed by the sensor.

At step 606, when each chute 212 within the multi-chute assembly 130 is sensed as containing a product and/or corresponds to an activated operator-override input, the multi-chute assembly 130 is then lowered via the multi-chute actuator 250, which may be configured to do so based on programmed instructions. At a step 608, each of the door assemblies are selectively opened via door actuators 218.

At a step 610, after the product 30 has dropped (e.g., after a wait time of 0.5 seconds or more; or the like), each of the door assemblies 260 are selectively closed via door actuator 218.

At a step 612, the multi-chute assembly 130 is raised via the multi-chute actuator 250.

These steps may be repeated as needed, such as for hours, continuously as the pouches 40 are sequentially moved into position.

One or more processors of controller 142 may include any one or more processing elements known in the art. In this sense, the one or more processors may include any microprocessor device configured to execute algorithms and/or instructions. In one embodiment, the one or more processors may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions from a non-transitory memory medium (e.g., memory). Moreover, different subsystems of the system 100 may include processor or logic elements suitable for carrying out at least a portion of the steps described throughout the present disclosure. Therefore, the above description should not be interpreted as a limitation on the present invention but merely an illustration.

The memory medium may include any storage medium known in the art suitable for storing program instructions executable by the associated one or more processors. For example, the memory medium may include a non-transitory memory medium. For instance, the memory medium may include, but is not limited to, a read-only memory, a random access memory, a magnetic or optical memory device (e.g., disk), a magnetic tape, a solid state drive and the like. In another embodiment, it is noted herein that the memory is configured to store one or more results from the system 100 and/or the output of the various steps described herein. It is further noted that memory may be housed in a common controller housing with the one or more processors. In an alternative embodiment, the memory may be located remotely with respect to the physical location of the processors and controller 142. For instance, the one or more processors of controller 142 may access a remote memory (e.g., server), accessible through a network (e.g., internet, intranet and the like). In another embodiment, the memory medium stores the program instructions for causing the one or more processors to carry out the various steps described through the present disclosure.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

In another embodiment, the controller 142 of the system 100 may be configured to receive and/or acquire data or information from other systems by a transmission medium that may include wireline and/or wireless portions. In another embodiment, the controller 142 of the system 100 may be configured to transmit data or information (e.g., the output of one or more processes disclosed herein) to one or more systems or sub-systems by a transmission medium that may include wireline and/or wireless portions. In this manner, the transmission medium may serve as a data link between the controller 142 and other subsystems of the system 100. Moreover, the controller 142 may send data to external systems via a transmission medium (e.g., network connection).

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A depositor apparatus, comprising:

an operator assembly configured to receive an operator;

a conveyor assembly coupled to the operator assembly and configured to move a plurality of product; and a multi-chute assembly coupled to the conveyor assembly and aligned with the operator assembly, the multi-chute assembly on an opposing side of the conveyor assembly from the operator assembly, the multi-chute assembly comprising a plurality of chute assemblies, wherein each chute assembly comprises:

a chute; and a door assembly coupled to the chute and configured to selectively open and thereby drop a product into a single pouch below the door assembly, wherein the door assembly comprises a first door and a second door, wherein the first door comprises a first set of gear teeth and the second door comprises a second set of gear teeth configured to align with and engage the first set of gear teeth to provide for a timing of the first door with the second door, wherein each chute assembly further comprises a door actuator coupled to at least one of the first door or the second door, and configured to perform the selective opening of the door assembly, wherein the selective opening of the door assembly is configured to open such that the first door and the second door swing down and outwards away from each other, wherein the first door is timed with the second door to ensure the selective opening of the first door is synchronized with the second door so the product is configured to drop from a center of the door assembly, wherein each chute of the plurality of chute assemblies of the multi-chute assembly is laterally disposed in a different position along a lateral direction relative to the operator such that the product may be selectively placed forward into any respective chute, wherein, in addition, each chute of the plurality of chute assemblies of the multi-chute assembly is longitudinally disposed along a longitudinal direction relative to the operator such that a distance as measured in the longitudinal direction between the operator and each chute is different for each chute of the multi-chute assembly and such that each chute of the multi-chute assembly is aligned with a different respective row of pouches of a plurality of adjacent rows of pouches below the multi-chute assembly, wherein the pouches of each row are configured to be sequentially disposed along the lateral direction and wherein each row is positioned relative to other rows in the longitudinal direction, wherein thereby the plurality of chute assemblies of the multi-chute assembly are configured to align with a plurality of staggered pouches, one pouch for each row, of the plurality of adjacent rows of pouches.

2. The depositor apparatus of claim 1, wherein the multi-chute assembly is coupled to a multi-chute assembly actuator configured to lower the multi-chute assembly relative to a plurality of pouches.

3. The depositor apparatus of claim 1, wherein each chute assembly further comprises a weight sensor configured to sense an absence of the product in the chute, and alert the operator based on the absence of the product via an operation of a light.

4. The depositor apparatus of claim 1, wherein each chute assembly further comprises a laser level sensor configured to sense an absence of the product in the chute.

5. The depositor apparatus of claim 1, wherein each chute assembly comprises non-stick surfaces.

6. The depositor apparatus of claim 5, wherein the non-stick surfaces comprise at least one of polished surfaces or electro-coated surfaces.

7. The depositor apparatus of claim 1, wherein the depositor apparatus comprises three or more wheels, wherein the depositor apparatus is configured to roll into and out of an operating position via the three or more wheels.

8. The depositor apparatus of claim 1, wherein the depositor apparatus comprises an opening between each chute and the conveyor assembly, wherein the opening is configured to receive the product.

9. The depositor apparatus of claim 1, wherein the depositor apparatus further comprises a second operator assembly and a second multi-chute assembly aligned with the second operator assembly.

10. The depositor apparatus of claim 1, wherein the operator assembly comprises a platform configured to support the operator, and a step coupled to the platform.

11. The depositor apparatus of claim 10, wherein the platform is configured to be height adjustable.

12. The depositor apparatus of claim 1, wherein the first door and the second door each comprises an inner-surface recessed feature proximate to an edge of the first door and an edge of the second door, wherein each inner-surface recessed feature is configured to store and capture liquid.

13. The depositor apparatus of claim 12, wherein the inner-surface recessed feature of the first door and the inner-surface recessed feature of the second door are between 0.01 inches and 0.3 inches deep.

14. The depositor apparatus of claim 12, wherein the inner-surface recessed feature of the first door and the inner-surface recessed feature of the second door are at least 3 inches long, measured, respectively, along the edge of the first door and the edge of the second door.

15. The depositor apparatus of claim 12, wherein the inner-surface recessed feature of the first door and the inner-surface recessed feature of the second door are between 0.05 inches and 1 inch wide.

16. The depositor apparatus of claim 1, wherein each multi-chute assembly is configured to individually slide away from the conveyor assembly for cleaning.

* * * * *